(12) United States Patent
Barnidge et al.

(10) Patent No.: US 9,644,816 B1
(45) Date of Patent: May 9, 2017

(54) TAILORED STRAY LIGHT CONTROL FOR DISPLAY APPLICATIONS

(71) Applicants: Tracy J. Barnidge, Marion, IA (US); Brian W. Walker, Cedar Rapids, IA (US); Joseph L. Tchon, Cedar Rapids, IA (US)

(72) Inventors: Tracy J. Barnidge, Marion, IA (US); Brian W. Walker, Cedar Rapids, IA (US); Joseph L. Tchon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 133 days.

(21) Appl. No.: 14/595,114

(22) Filed: Jan. 12, 2015

(51) Int. Cl.
*G09F 13/04* (2006.01)
*F21V 9/00* (2015.01)
*F21V 3/02* (2006.01)

(52) U.S. Cl.
CPC . *F21V 9/00* (2013.01); *F21V 3/02* (2013.01)

(58) Field of Classification Search
CPC ................................... F21V 9/00; F21V 3/02
USPC ........................................................ 362/97.1
See application file for complete search history.

(56) References Cited

U.S. PATENT DOCUMENTS

| 8,816,578 B1 | 8/2014 | Peng et al. |
| 2009/0085831 A1* | 4/2009 | Odoi ................. G02F 1/133524 345/1.3 |

* cited by examiner

*Primary Examiner* — Anh Mai
*Assistant Examiner* — Hana Featherly
(74) *Attorney, Agent, or Firm* — Angel N. Gerdzhikov; Donna P. Suchy; Daniel M. Barbieri

(57) ABSTRACT

A piecewise light control layer includes a plurality of light control portions including a first light control portion and a second light control portion. The first light control portion is configured to restrict light having a first angular profile. The second light control portion is configured to restrict light having a second angular profile, wherein the first angular profile is different from the second angular profile.

18 Claims, 10 Drawing Sheets

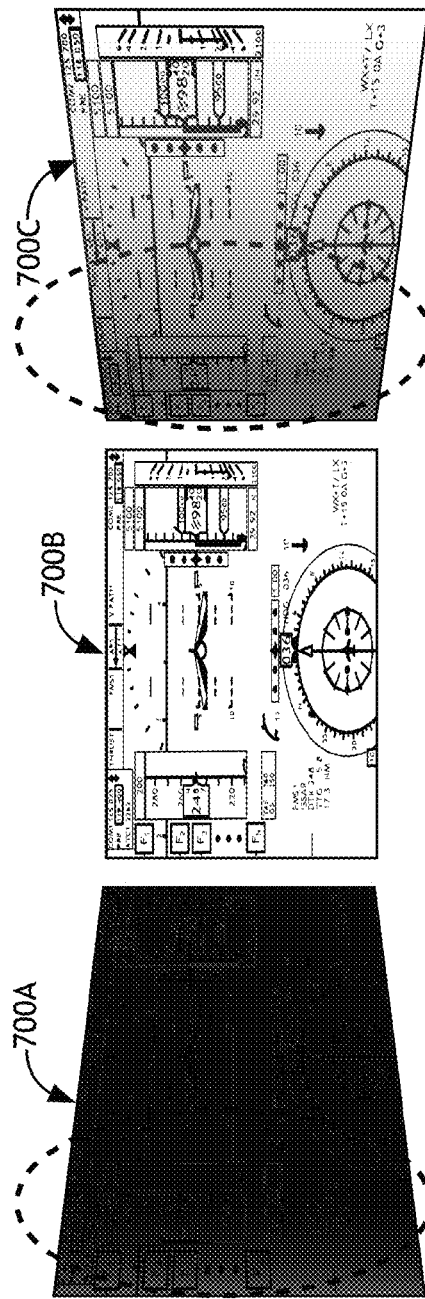
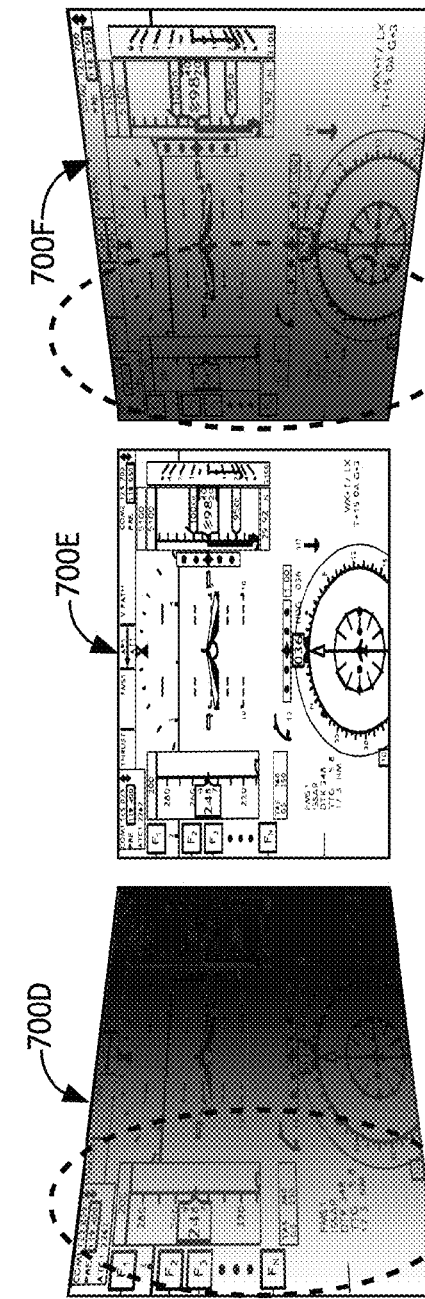
FIG. 7A
FIG. 7B
FIG. 7C
FIG. 7D
FIG. 7E
FIG. 7F

TAILORED STRAY LIGHT CONTROL FOR DISPLAY APPLICATIONS

CROSS-REFERENCE TO RELATED APPLICATIONS

The present application is related to U.S. patent application Ser. No. 13/550,277, which issued as U.S. Pat. No. 8,816,578 on Aug. 26, 2014; U.S. patent application Ser. No. 13/550,277 and U.S. Pat. No. 8,816,578 are herein incorporated by reference in their entirety.

FIELD OF THE INVENTION

Embodiments of the invention are directed generally toward light control layers and display assemblies.

BACKGROUND

Currently, louver films in display applications only deliver acceptable performance when viewed by a viewer along a louver axis. Currently, louver films have a uniform louver angle, louver pitch, and film thickness across the louver film. A viewer's angle of view, however, changes across the display (e.g., the angle of view at the center of the display is different than at edges of the display). This change in the viewer's angle of view across the display causes two problems: 1) luminance is reduced when a viewer looks at the edges of the display; and 2) light is emitted at angles outside of and not visible to the viewer's field of view, which may cause unwanted reflections off nearby reflective surfaces (such as a bubble canopy of an aircraft cockpit, a window of a vehicle, a window of room, another display, or the like).

Micro-louver films have been used to restrict the angle at which a display may be viewed. Micro-louver films restrict the transmission of light through the use of tightly spaced, embedded louvers (which are typically black). Micro-louver films are typically constructed using small, absorptive louvers to restrict the angular profile of transmitted light through the film. Currently, these parameters are fixed in one axis across the entire film. Micro-louver films are typically used in applications requiring privacy and security, such as to prevent unauthorized viewing of private information on a monitor or public-use kiosk (e.g., an automatic teller machine (ATM), etc.). Given the high non-recurring cost to manufacturer custom micro-louver films, they are offered in a limited selection of louver pitches, louver angles, and film thicknesses for a limited selection of viewing angles. Such manufacturing limitations diminish the ability to tailor a luminance profile across a display for specific applications (e.g., military cockpits, etc.).

Previous attempts to direct the light towards the viewer while reducing stray light emissions have included the use of light shaping diffusers and optical films (e.g., micro-prismatic brightness enhancement and light turning films, etc.). While such light shaping diffusers and optical films typically provide more transmission and are helpful in steering more light towards the user, they do not provide the same level of off-axis light suppression as compared to micro-louver films. In addition, light shaping diffusers and optical films are rendered ineffective when placed behind micro-louver films due to louver off-axis light absorption properties. Additionally, neither light shaping diffusers nor optical films provide a solution to account for the change in angle of view when looking across the display surface.

SUMMARY

In one aspect, embodiments of the inventive concepts disclosed herein are directed to a display assembly including a non-flat transmissive display element and a non-flat light control layer. The non-flat light control layer includes at least one micro-louver film portion configured to restrict light having an angular profile. The non-flat light control layer is shaped to allow transmittance of light passing through the non-flat transmissive display element in a predetermined display field containing a predetermined design eye point. The non-flat light control layer is shaped to restrict transmittance of light outside of the predetermined display field containing the predetermined design eye point.

In a further aspect, embodiments of the inventive concepts disclosed herein are directed to a display assembly including a non-flat emissive display element and a non-flat light control layer. The non-flat light control layer includes at least one micro-louver film portion configured to restrict light having an angular profile. The non-flat light control layer is shaped to allow transmittance of light emitted from the non-flat emissive display element in a predetermined display field containing a predetermined design eye point. The non-flat light control layer is shaped to restrict transmittance of light outside of the predetermined display field containing the predetermined design eye point.

In yet another aspect, embodiments of the inventive concepts disclosed herein are directed to a piecewise light control layer. The piecewise light control layer includes a plurality of light control portions including a first light control portion and a second light control portion. The first light control portion is configured to restrict light having a first angular profile. The second light control portion is configured to restrict light having a second angular profile, wherein the first angular profile is different from the second angular profile.

Additional embodiments are described in the disclosure including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which:

FIG. 7A shows a display assembly having a non-flat light control film of a particular embodiment as viewed at an angle of 40 degrees;

FIG. 7B shows a display assembly having a non-flat light control film of a particular embodiment as viewed at an angle of zero degrees;

FIG. 7C shows a display assembly having a non-flat light control film of a particular embodiment as viewed at an angle of −20 degrees;

FIG. 7D shows a display assembly having a flat light control film as viewed at an angle of 40 degrees;

FIG. 7E shows a display assembly having a flat light control film as viewed at an angle of zero degrees;

FIG. 7F shows a display assembly having a flat light control film as viewed at an angle of −20 degrees;

DETAILED DESCRIPTION

Figure 1A:
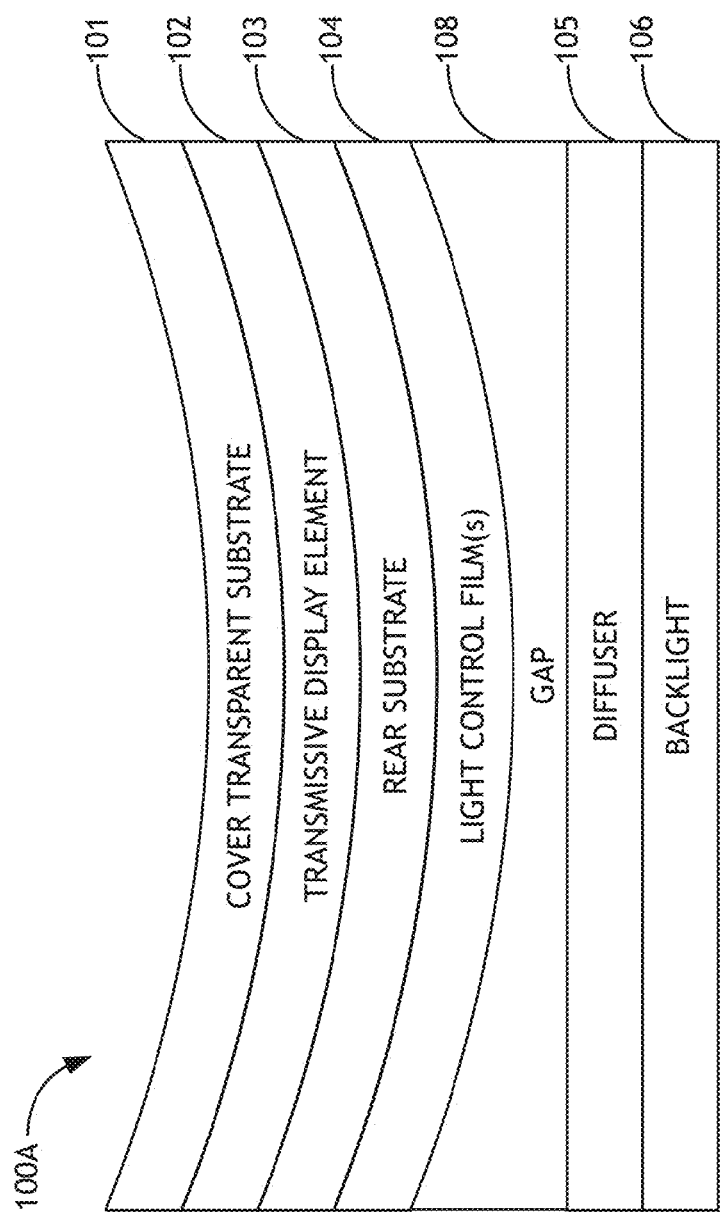
FIG. 1A shows a diagrammatic cross-sectional view of a non-flat transmissive display assembly of one embodiment.

Reference will now be made in detail to the subject matter disclosed, which is illustrated in the accompanying drawings. The scope of the disclosure is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the inventive concepts disclosed herein include at least one (e.g., one, two, three, or more) light control layer such that light is transmitted through the at least one light control layer in a predetermined display field that contains one or more design eye points (e.g. a design eye point for one viewer, a first design eye point for a first viewer and a second design eye point for a second viewer, or the like). Embodiments including the at least one light control layer are configured to restrict the transmission of stray light directed outside of the display field to reduce unwanted reflections off nearby reflective surfaces (such as a bubble canopy of an aircraft cockpit, a window of a vehicle, a window of room, another display, or the like) while allowing a viewer of a display assembly to view luminance across the entire display (e.g., from anywhere between the edges of the display assembly and the center of the display assembly). In some embodiments, a light control layer is or includes a micro-louver film configured to restrict light having an angular profile. In some embodiments, a light control layer is or includes a flat or non-flat (e.g., curved, angled, or the like) light control layer. In some embodiments, the light control layer is or includes a piecewise light control layer having a plurality of light control portions each configured to restrict light having a different angular profile such that light is transmitted through each of the plurality of light control portions in a predetermined display field that contains one or more (e.g., one or two) design eye points.

In some embodiments, micro-louver angles are changed across a micro-louver film so that portions of the micro-louver film are always viewed along the louver axis. In some embodiments, changing the micro-louver angles is accomplished by implementing the micro-louver film within, affixed to, or as a non-flat (e.g., curved, angular, or the like) light control layer such that light is restricted by the non-flat light control layer at different curvature angles corresponding to different locations (e.g., center, edges, or the like) of a display assembly. In other embodiments, changing the micro-louver angles is accomplished by implementing the micro-louver film as piecewise micro-louver film wherein the piecewise micro-louver film includes a plurality of micro-louver film portions with different micro-louver film portions having at least one micro-louver film property (e.g., louver angle, louver pitch, louver film thickness, or the like) different from other micro-louver film portions.

In some embodiments, the light control layer is positioned (e.g., in front of or behind) with respect to a display element (such as a transmissive display element (e.g., a liquid crystal display (LCD) element) or an emissive display element (e.g., an organic light emitting diode (OLED) element)) to generate a tailored luminance profile. In some embodiments, a desired luminance profile may be achieved such that a direction of maximum transmittance through the film substantially aligns with a design eye point across part or all of a display area. Furthermore, embodiments including the light control layer reduce or eliminate transmission of stray light, which would otherwise be transmitted outside of the desired display field, across the entire display area rather than only portions (e.g., a center portion or one edge portion) of the display area. Such a reduction in stray light results in fewer or no reflections onto nearby surfaces (e.g., interior of a bubble canopy, etc.). In some embodiments, at least one non-flat light control layer is implemented along one or more axes (e.g., horizontal, vertical, diagonal, and/or the like) of the display to provide a suitable display field with restrictions in stray light in one or more directions (e.g., horizontal direction, vertical direction, and/or the like).

In some embodiments, one or more light control layers may be implemented in or in proximity to (e.g., in front of or between the display assembly and a viewer) any type of display assembly (e.g., head down display, head up display, a touch-screen display assembly, television, monitor, handheld display device, wearable display device (e.g., a headset display), or the like).

Referring now to FIG. 1A, a diagrammatic cross-sectional view of a non-flat transmissive display assembly 100A of one embodiment is shown. The non-flat transmissive display assembly 100A includes a non-flat cover transparent substrate 101, a non-flat transmissive display element 102, a non-flat rear substrate 103, one or more non-flat light control films 104, a gap 108, a flat diffuser 105, and a flat backlight 106. As shown, light is emitted from the flat backlight 106 and passes through the flat diffuser 105, the gap 108, the one or more non-flat light control films 104, the non-flat rear substrate 103, the non-flat transmissive display element 102, and the non-flat cover transparent substrate 101 causing an image to be displayed by the non-flat transmissive display assembly 100A. Each of the one or more non-flat light control films 104 may include or be implemented as a micro-louver film. In some embodiments, each of the one or more light control films 104 may be affixed to a substrate (e.g., the rear substrate 103), another light control film, or another element of the non-flat transmissive display assembly 100A. The one or more light control films 104 may be implemented as or included in one or more light control layers. In some embodiments, at least one of the one or more non-flat light control films 104 are implemented as or included within a piecewise light control layer (as described in more detail, below, with respect to FIG. 8D). While a particular implementation having particular elements and a particular arrangement of elements is shown in FIG. 1A, some implementations include only some of the elements shown in FIG. 1A, include additional elements not specifically shown in FIG. 1A, or include other arrangements of the elements shown (or not shown) in FIG. 1A. For example, while a particular embodiment including a gap 108, a flat diffuser 105, and a flat backlight 106 is shown in FIG. 1A, in some embodiments the non-flat transmissive display assembly 100A includes a non-flat (e.g., curved) backlight 106 and/or a non-flat diffuser 105. In one embodiment, the gap 108 is omitted from the display assembly and the backlight 106, the diffuser 105, the light control film 104, the rear substrate 103, the transmissive display element 102, and the cover transparent substrate 101 are all conformally curved (e.g., having the same curvature shape).

Figure 1B:
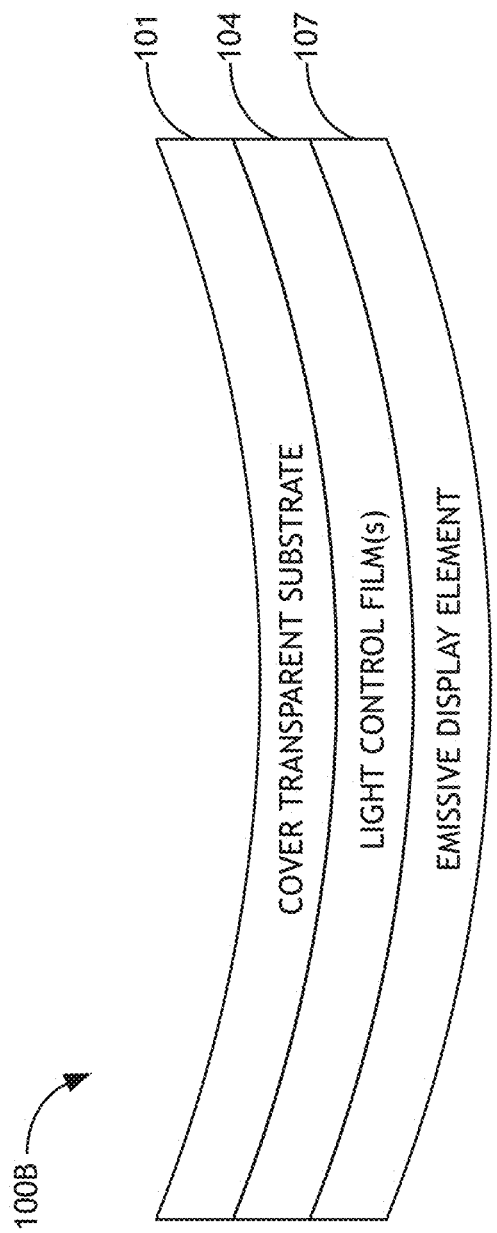
FIG. 1B shows a diagrammatic cross-sectional view of a non-flat emissive display assembly of one embodiment.

Referring now to FIG. 1B, a diagrammatic cross-sectional view of a non-flat emissive display assembly 100B of some embodiments is shown. The non-flat emissive display assembly 100B includes a non-flat cover transparent substrate 101, one or more non-flat light control films 104, and a non-flat emissive display element 107. As shown, light is emitted from the non-flat emissive display element 107 and passes through the one or more non-flat light control films 104 and the non-flat cover transparent substrate 101 causing an image to be displayed by the non-flat emissive display assembly 100B. Each of the one or more non-flat light control films 104 may include or be implemented as a micro-louver film. In some implementations, each of the one or more light control films 104 may be affixed to a substrate (e.g., the cover transparent substrate 101), another light control film, or another element of the non-flat emissive display assembly 100B. The one or more light control films 104 may be implemented as or included in one or more light control layers. In some embodiments, at least one of the one or more non-flat light control films 104 are implemented as or included within a piecewise light control layer (as described in more detail, below, with respect to FIG. 8D). In some embodiments, the non-flat cover transparent substrate 101, the one or more non-flat light control films 104, and the non-flat emissive display element 107 are conformally curved (e.g., having the same curvature shape) such that the one or more non-flat light control films 104 can be positioned intimately in front of the non-flat emissive display element 107. While a particular implementation having particular elements and a particular arrangement of elements is shown in FIG. 1B, some implementations include only some of the elements shown in FIG. 1B, include additional elements not specifically shown in FIG. 1B, or include other arrangements of the elements shown (or not shown) in FIG. 1B.

Figure 2:
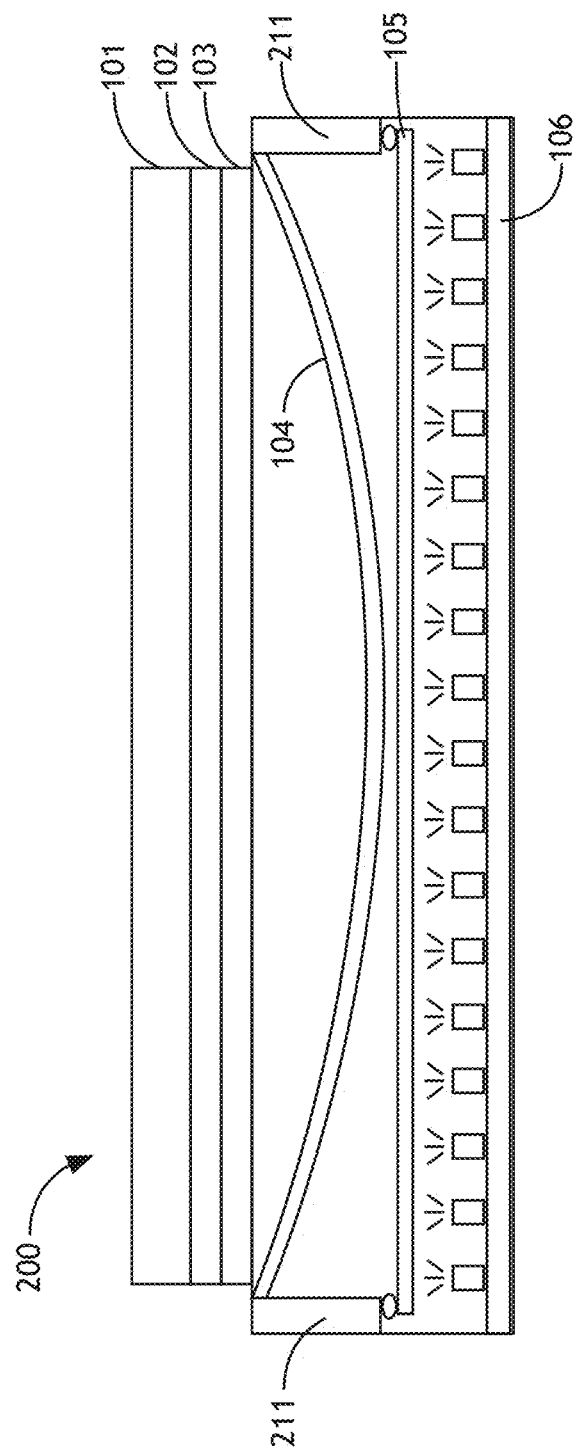
FIG. 2 shows a cross-sectional view of transmissive display assembly having a non-flat light control layer of one embodiment.

Referring now to FIG. 2, a cross-sectional view of a transmissive display assembly 200 having a non-flat light control layer of one embodiment is shown. The transmissive display assembly 200 includes a cover transparent substrate 101, a transmissive display element 102, a rear substrate 103, a mounting bracket or frame 211, a non-flat light control layer including a light control film 104, a diffuser 105, and a backlight 106. In some embodiments, the non-flat light control layer is held in place by the mounting bracket or frame 211 above the diffuser 105 and below the rear substrate 103. In some embodiments, the light control film 104 comprises a micro-louver film having particular micro-louver film properties (e.g., a particular louver angle, a particular louver pitch, and a particular micro-louver film thickness). In some embodiments, the non-flat light control layer, which includes a micro-louver film, is curved by a suitable amount to provide a designed display field containing a design eye point given the particular micro-louver film properties. For example, the non-flat light control layer has a particular radius of curvature along one axis (e.g., along a horizontal or vertical axis), wherein the radius of curvature is a distance between the non-flat light control layer along an axis and a design eye point such that radius of curvature is applied across the non-flat light control layer along the one axis. In one embodiment, the radius of curvature of the non-flat light control layer may be approximately 29 inches (e.g., 29 inches+/−2 inches) such that the non-flat light control layer has a substantially semicircular cross-section along one axis (see, e.g., FIG. 8A); however, in some embodiments, the radius of curvature of the non-flat light control layer may be any suitable distance (e.g., between 1 inch (such as in single-eye display of a headset configured to reduce reflection of stray light off housing portions of the headset) and 144 inches (such as for a television display), or more (such as for a movie theater sized display assembly) between the non-flat light control layer and a particular desired design eye point to produce a desired display field such that non-flat light control layer has a substantially semicircular cross-section along one axis (see, e.g., FIG. 8A). Additionally, in some embodiments, the curvature of the non-flat light control layer has a non-semicircular curvature cross-section (e.g., an elliptical cross-section curvature (see, e.g., FIGS. 3 and 4), a variable (e.g., flared) curvature gradient along one axis (see, e.g., FIG. 8B), non-uniform curvature, an angled curvature cross-section having one or more substantially straight portions that meet at an angle (see, e.g., FIG. 8C), or otherwise non-semicircular curvature cross-section) such that the radius of curvature between a point on the surface of the non-flat light control layer and the design eye point changes across the surface of the non-flat light control layer. In some embodiments, the non-flat light control layer has a semicircular or non-semicircular curvature cross-section along one axis and flat cross-section along a second axis. Further, in some embodiments, the non-flat light control layer is curved in two or more directions (e.g., along a horizontal axis, a vertical axis, and/or the like); for example, the non-flat light control layer may have a semicircular or non-semicircular curvature component cross-section along a first axis (e.g., horizontal or vertical axis) from a first edge to a second edge of the non-flat light control layer while having a second semicircular or non-semicircular curvature component cross-section along a second axis (e.g., vertical or horizontal axis) from a third edge to a fourth edge of the non-flat light control layer.

Figure 3:
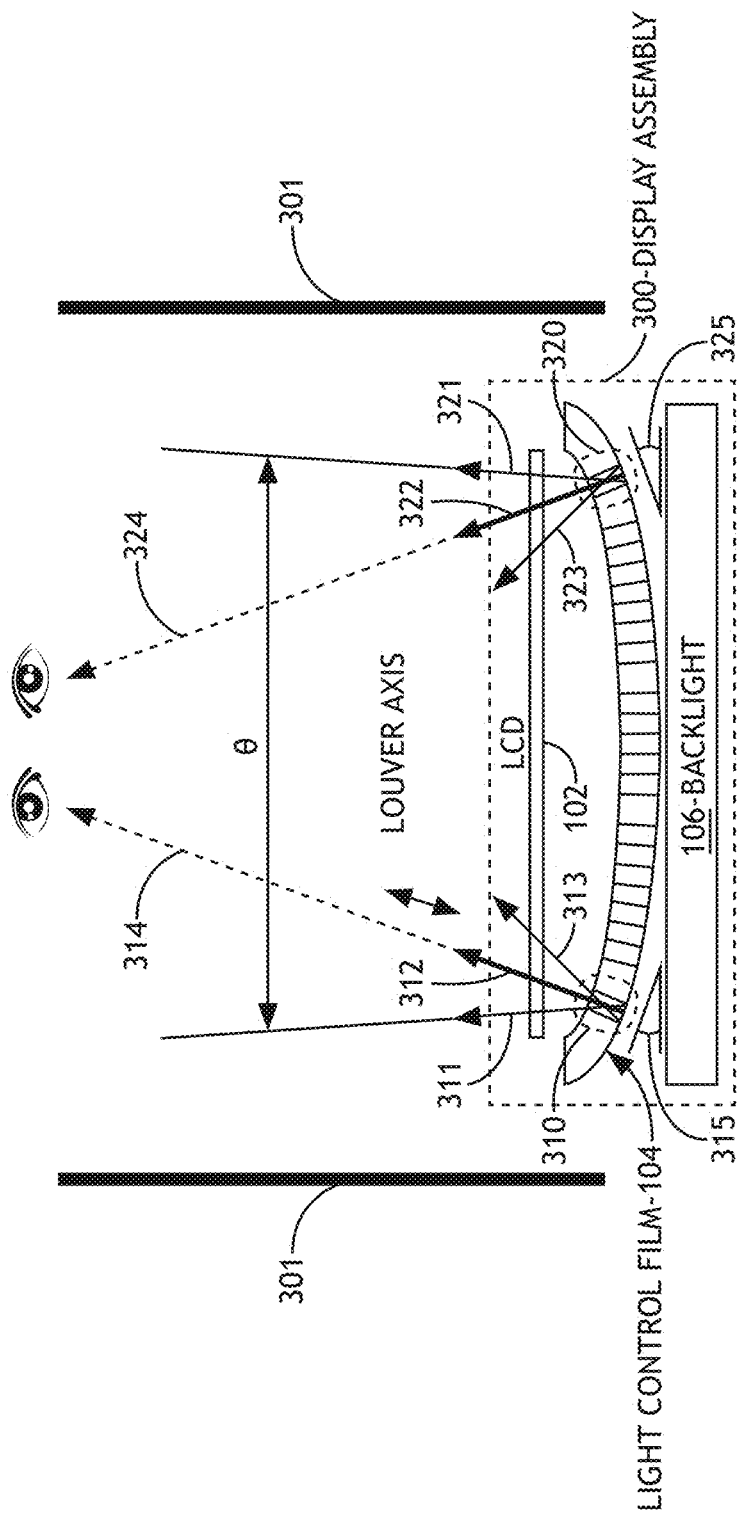
FIG. 3 shows a cross-sectional view of a transmissive display assembly implemented in a cockpit of an aircraft of some embodiments.

Referring now to FIG. 3, a cross-sectional view of a transmissive display assembly 300 implemented in a cockpit of an aircraft of some embodiments is depicted. In some embodiments, the transmissive display assembly 300 includes a non-flat or flat backlight 106, a non-flat light control film 104 (such as a uniform or piecewise micro-louver film implemented as or included in a non-flat light control layer), and a non-flat or flat transmissive display element 102 (e.g., an LCD display element). As shown in FIG. 3, the non-flat light control film 104 is a uniform micro-louver film having perpendicularly angled (i.e., angled 90 degrees across the light control film) micro-louvers applied to a non-flat substrate, though the micro-louver film may be implemented with non-perpendicular micro-louver angles or as a piecewise micro-louver film (which may or may not include a micro-louver portion including perpendicular micro-louver angles) in other embodiments. In some embodiments, the display assembly 300 has a display field which reduces or eliminates the projection of the displayed image on to the canopy surface 301, which improves a pilot's ability to see through the canopy surface 301. Additionally, transmitted light from portions of the screen of the display assembly 300 with a non-flat micro-louver film may have improved luminance to the pilot across the entire display surface.

As shown in FIG. 3, in some embodiments, the non-flat light control film 104 allows the transmission of light having a predefined angular profile (e.g., based on the angular disposition (e.g., angle of curvature 315, 325) of a particular portion (e.g., non-flat light control film edge portions 310, 320) of the non-flat light control film 104 and based on the micro-louver film properties (e.g., micro-louver angle, micro-louver pitch, and micro-louver film thickness) of a particular micro-louver film portion). As such, the light transmitted through the non-flat light control layer is restricted at least in part to transmitted light having a most inwardly pointed direction (e.g., toward the central axis of the light control layer, such as in the direction of the most inwardly pointing transmitted light 313, 323) and a most edgewardly pointing direction (e.g., away from a central axis of the non-flat light control layer, such as in the direction of the most edgewardly pointing transmitted light 311, 321). For example, as shown in FIG. 3, the light allowed to be transmitted through a first non-flat light control film edge portion 310 includes most edgewardly pointing transmitted light 311, louver pointing transmitted light 312 (e.g., light transmitted with a same angle as the louver angle), and most inwardly pointing transmitted light 313; and the light allowed to be transmitted through an opposite non-flat light control film edge portion 320 includes most edgewardly pointing transmitted light 321, louver pointing transmitted light 322 (e.g., light transmitted with a same angle as the louver angle), and most inwardly pointing transmitted light 323. In some embodiments, the louver pointing transmitted light 312, 322 is designed to point along a radius (e.g., 314, 324) of curvature between a corresponding portion (e.g., 310, 320) of the non-flat light control film 104 and a design eye point.

Also, as shown in FIG. 3, in some embodiments, a display field of the display assembly 300 may be defined at least in part by a display field angle, θ, which is an angle between a direction of most edgewardly pointing transmitted light 311 through a first edge portion 310 and a direction of most edgewardly pointing transmitted light 321 through an opposite edge portion 320 of the non-flat light control layer (or display edges).

Figure 4:
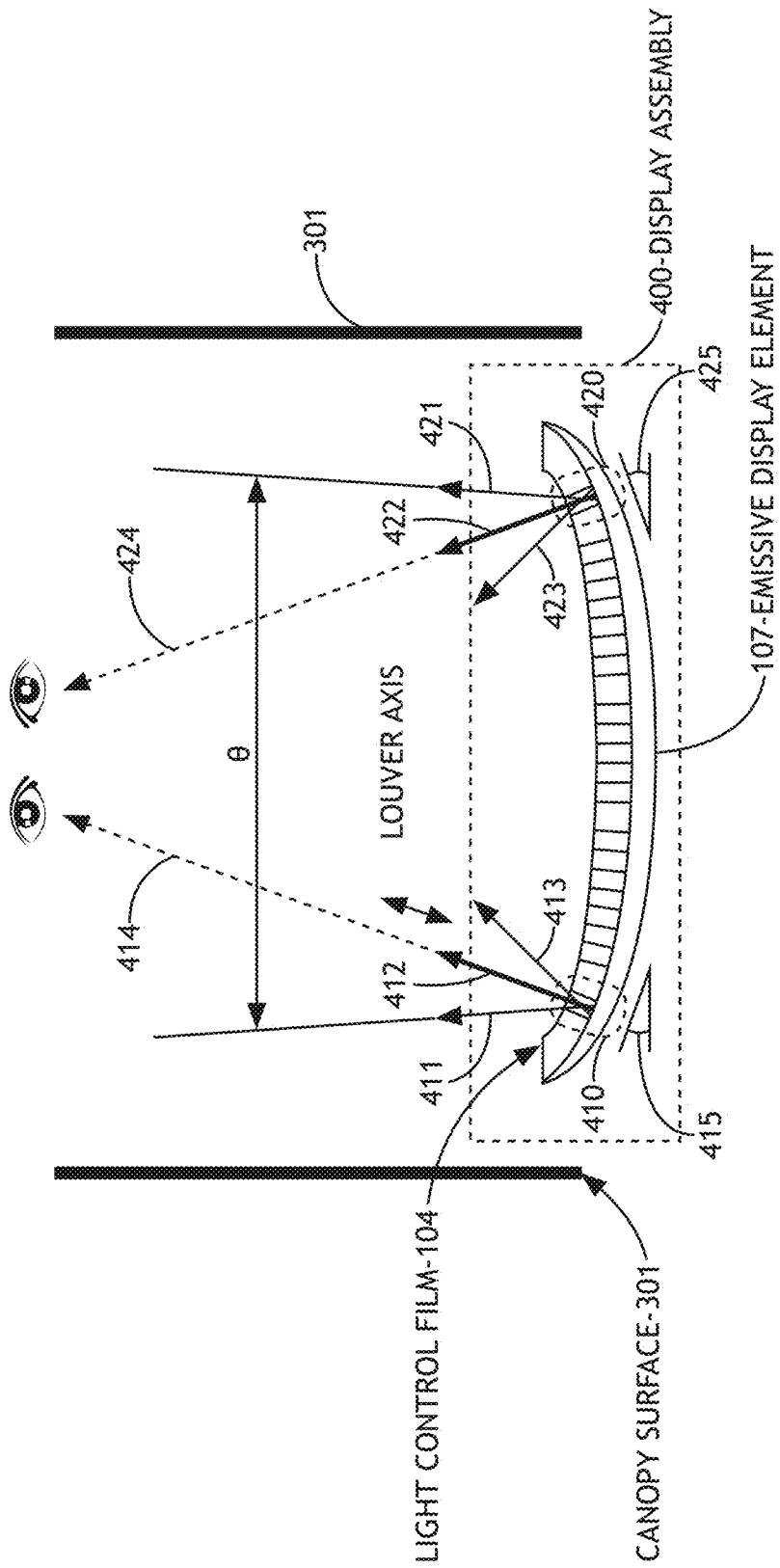
FIG. 4 shows a cross-sectional view of an emissive display assembly implemented in a cockpit of an aircraft of some embodiments.

Still referring to FIG. 3, in some embodiments, a combination of at least (a) an angle of curvature (e.g., 315 or 325) at an edge portion (e.g., 310 or 320) of the non-flat light control layer and (b) particular micro-louver film properties at the edge portion (e.g., 310 or 320) restricts transmission of edgewardly directed light (e.g., 311 or 321) from passing through the edge portion (e.g., 310 or 311) of the non-flat light control layer in excess of a particular designed angle (e.g., one-half of the design field angle, θ, for a non-flat light control layer having a symmetrical cross-section) relative to a centerline perpendicularly passing through a center of the non-flat light control layer. In such embodiments, the display field may be defined with respect to at least one axis by such designed angles at opposite edge portions (e.g., 310, 320) of the non-flat light control layer. In some embodiments, the designed angle is not more than 35 degrees, not more than 25 degrees, not more than 20 degrees, not more than 10 degrees, not more than 5 degrees, not more than 4 degrees, or the like. Restriction of the transmission of edgewardly directed light from passing through the edge portions (e.g., 310, 320) of the non-flat light control layer in excess of a particular designed angle reduces the reflection of light from the display off of nearby surfaces (such as the canopy surface 301). Referring now to FIG. 4, a cross-sectional view of an emissive display assembly 400 implemented in a cockpit of an aircraft of some embodiments is depicted. In some embodiments, the emissive display assembly 400 includes a non-flat light control film 104 (such as a uniform or piecewise micro-louver film implemented as or included in a non-flat light control layer) and a flat or non-flat emissive display element 107 (e.g., an OLED display element). As shown in FIG. 4, the non-flat light control film 104 is a uniform micro-louver film having perpendicularly angled (i.e., angled 90 degrees throughout the light control film) micro-louvers applied to a non-flat substrate, though the micro-louver film may be implemented with non-perpendicular micro-louver angles or as a piecewise micro-louver film (which may or may not include a micro-louver portion including perpendicular micro-louver angles) in other embodiments. In some embodiments, the display assembly 400 has a display field which reduces or eliminates the projection of the displayed image on to the canopy surface 301, which improves a pilot's ability to see through the canopy surface 301. Additionally, transmitted light from portions of the screen of the display assembly 400 with a non-flat micro-louver film may have improved luminance to the pilot across the entire display surface.

As shown in FIG. 4, in some embodiments, the non-flat light control film 104 allows the transmission of light having a predefined angular profile (e.g., based on the angular disposition (e.g., angle of curvature 415, 425) of a particular portion (e.g., non-flat light control film edge portions 410, 420) of the non-flat light control film 104 and based on the micro-louver film properties (e.g., micro-louver angle, micro-louver pitch, and micro-louver film thickness) of a particular micro-louver film portion). As such, the light transmitted through the non-flat light control layer is restricted at least in part to transmitted light having a most inwardly pointed direction (e.g., toward the central axis of the light control layer, such as in the direction of the most inwardly pointing transmitted light 413, 423) and a most edgewardly pointing direction (e.g., away from a central axis of the non-flat light control layer, such as in the direction of the most edgewardly pointing transmitted light 411, 421). For example, as shown in FIG. 4, the light allowed to be transmitted through a first non-flat light control film edge portion 410 includes most edgewardly pointing transmitted light 411, louver pointing transmitted light 412 (e.g., light transmitted with a same angle as the louver angle), and most inwardly pointing transmitted light 413; and the light allowed to be transmitted through an opposite non-flat light control film edge portion 420 includes most edgewardly pointing transmitted light 421, louver pointing transmitted light 422 (e.g., light transmitted with a same angle as the louver angle), and most inwardly pointing transmitted light 423. In some embodiments, the louver pointing transmitted light 412, 422 is designed to point along a radius (e.g., 414, 424) of curvature between a corresponding portion (e.g., 410, 420) of the non-flat light control film 104 and a design eye point.

Also, as shown in FIG. 4, in some embodiments, a display field of the display assembly 400 may be defined at least in part by a display field angle, θ, which is an angle between a direction of most edgewardly pointing transmitted light 411 through a first edge portion 410 and a direction of most edgewardly pointing transmitted light 421 through an opposite edge portion 420 of the non-flat light control layer (or display edges).

Still referring to FIG. 4, in some embodiments, a combination of at least (a) an angle of curvature (e.g., 415 or 425) at an edge portion (e.g., 410 or 420) of the non-flat light control layer and (b) particular micro-louver film properties at the edge portion (e.g., 410 or 420) restricts transmission of edgewardly directed light (e.g., 411 or 421) from passing through the edge portion (e.g., 410 or 420) of the non-flat light control layer in excess of a particular designed angle (e.g., one-half of the design field angle, θ, for a non-flat light control layer having a symmetric cross-section) relative to a centerline perpendicularly passing through a center of the non-flat light control layer. In such embodiments, the display field may be defined with respect to at least one axis by such designed angles at opposite edge portions (e.g., 410, 420) of the non-flat light control layer. In some embodiments, the designed angle is not more than 35 degrees, not more than 25 degrees, not more than 20 degrees, not more than 10 degrees, not more than 5 degrees, not more than 4 degrees, or the like. Restriction of the transmission of edgewardly directed light from passing through the edge portions (e.g., 410, 420) of the non-flat light control layer in excess of a particular designed angle reduces the reflection of light from the display off of nearby surfaces (such as the canopy surface 301).

Figure 5:
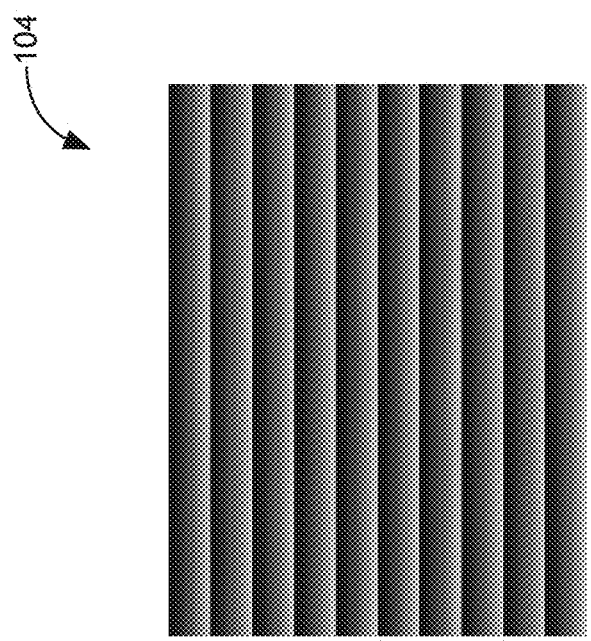
FIG. 5 shows a close-up top view of a portion of a light control film suitable for use in embodiments.

Referring now to FIG. 5, a close-up top view of a portion of a light control film 104 suitable for use in embodiments of the invention is depicted. In some embodiments, the light control film 104 is a micro-louver film. The light control film 104 is configured to constrain light in one direction. Some embodiments may include two or more light control films 104 positioned above or below one another, wherein each of the two or more light control films 104 constrains light in a different direction (e.g., in the horizontal direction, in the vertical direction, or any diagonal direction). In some embodiments, the light control film 104 is implemented as a micro-louver film. In some embodiments, the micro-louver film includes any of various suitable micro-louver film properties (e.g., micro-louver angle, micro-louver pitch, and micro-louver film thickness). In some embodiments, the micro-louver film includes an optical substrate having very fine black louvers spaced at a pitch across the film in the constrained direction. In some embodiments, each of the louvers is positioned within the film at a particular angle (e.g., perpendicular, less than 90 degrees, 85 degrees, 80 degrees, 45 degrees, less than 45 degrees, or the like). In some embodiments, the micro-louver film has any of various suitable film thicknesses. Micro-louver film with a particular combination of micro-louver film properties affects how light is constrained in a particular direction.

Figure 6:
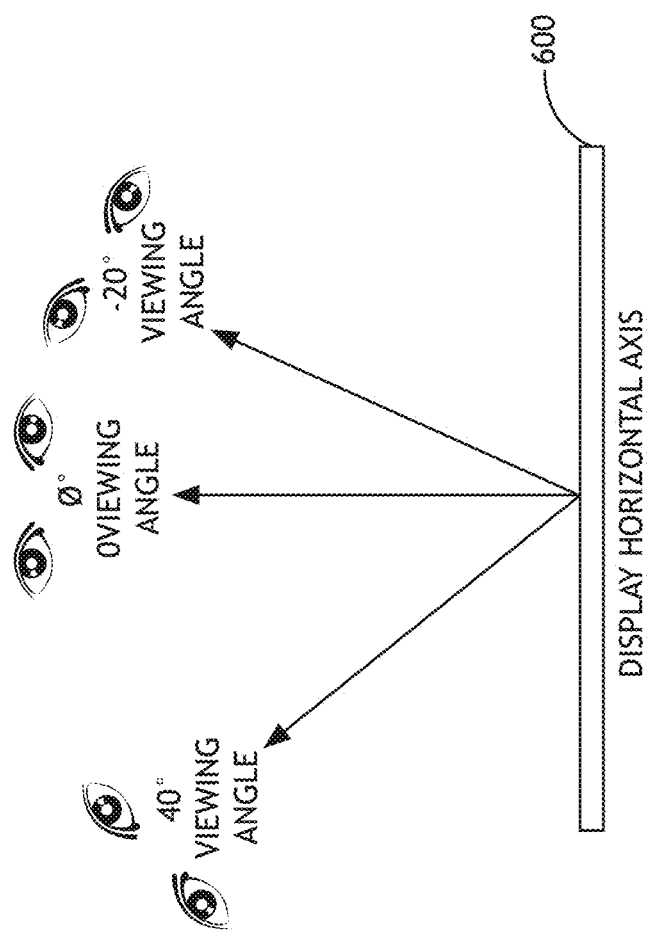
FIG. 6 shows a diagram depicting various viewing angles relative to a horizontal axis of a display.

Referring now to FIG. 6, a diagram depicting various viewing angles (e.g., 40 degrees, zero degrees (i.e., centered), and −20 degrees) relative to a horizontal axis of a display 600 is shown.

Referring generally now to FIGS. 7A-F, depictions of a display assembly having a non-flat light control film of a particular embodiment as viewed at different viewing angles (see FIGS. 7A-C) as compared to a similar display assembly having a flat light control film as viewed at the different viewing angles (see FIGS. 7D-F) are shown. FIGS. 7A-C illustrate display assemblies 700A, 700B, 700C implemented with a representative LED backlight and non-flat light control layer including a micro-louver film in a curved (with a radius of curvature of approximately 29 inches) configuration. FIGS. 7D-F illustrate display assemblies 700D, 700E, 700F implemented with a representative LED backlight and flat light control layer including a flat micro-louver film configuration.

Referring now to FIG. 7A, a display assembly 700A having a non-flat light control film of a particular embodiment as viewed at an angle of 40 degrees is shown. At 40 degrees, the display assembly 700A has a very low luminance profile across the entire display assembly 700A, which demonstrates that there is little stray light and would be little (if any) reflection of a displayed image off a nearby surface at such an angle (as compared to a display assembly 700D having a flat light control film as shown in FIG. 7D).

Referring now to FIG. 7B, a display assembly 700B having a non-flat light control film of a particular embodiment as viewed at an angle of zero degrees is shown. At zero degrees, the display assembly 700B has a very high luminance profile across the entire display assembly 700B (similar to display assembly 700E).

Referring now to FIG. 7C, a display assembly 700C having a non-flat light control film of a particular embodiment as viewed at an angle of −20 degrees is shown. At −20 degrees the display assembly 700C has at least a moderate (at the circled left portion) to high luminance profile across the entire display assembly 700C. At −20 degrees, the display assembly 700C provides a more uniform luminance gradient than a display assembly 700F having a flat light control film as shown in FIG. 7F.

Referring now to FIG. 7D, a display assembly 700D having a flat light control film as viewed at an angle of 40 degrees is shown. At 40 degrees, the display assembly 700D has a relatively high luminance on the left side, which demonstrates that there is a significant amount of stray light and would be significant reflection of a displayed image off a nearby surface at such an angle.

Referring now to FIG. 7E, a display assembly 700E having a flat light control film as viewed at an angle of zero degrees is shown. At zero degrees, the display assembly 700E has a very high luminance profile across the entire display assembly 700E.

Referring now to FIG. 7F, a display assembly 700F having a flat light control film as viewed at an angle of −20 degrees is shown. At −20 degrees the display assembly 700F has a relatively low (at the circled left portion) to high luminance profile across the entire display assembly 700F. At −20 degrees, the display assembly 700F has somewhat lower luminance and less uniform luminance gradient than display assembly 700C having a non-flat light control film as shown in FIG. 7C.

FIGS. 7A-7F demonstrate that display assembly 700A, 700B, 700C having a non-flat light control layer of a particular embodiment offers improvements over the display assembly 700D, 700E, 700F having a flat light control layer because the display assembly 700A, 700B, 700C reduces that amount of stray light at wider viewing angles and because the display assembly 700A, 700B, 700C has a more uniform luminance across the entire display at a 20 degree viewing angle.

Figure 8A:
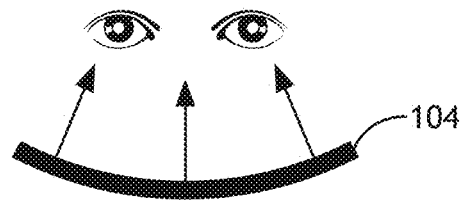
FIG. 8A shows a non-flat light control layer having a substantially semicircular curvature cross-section across a horizontal axis of some embodiments.
Figure 8B:
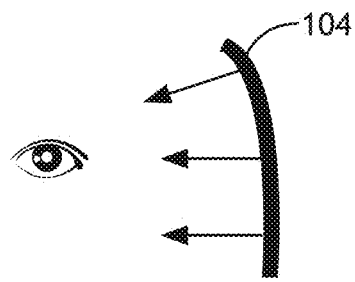
FIG. 8B shows a non-flat light control layer having a variable (e.g., flared) curvature cross-section along a vertical axis of some embodiments.
Figure 8C:
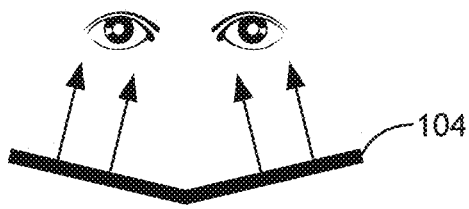
FIG. 8C shows a non-flat light control layer having an angled curvature cross-section having one or more substantially straight portions that meet at an angle along a horizontal axis of some embodiments.

Referring now to FIGS. 8A-C, exemplary non-flat light control layers including a non-flat light control film 104 of some embodiments are depicted. FIG. 8A depicts a non-flat light control layer having a substantially semicircular curvature cross-section across a horizontal axis of some embodiments. FIG. 8B depicts a non-flat light control layer having a variable (e.g., flared) curvature cross-section along a vertical axis of some embodiments. FIG. 8C depicts a non-flat light control layer having an angled curvature cross-section having one or more substantially straight portions that meet at an angle along a horizontal axis of some embodiments.

Figure 8D:
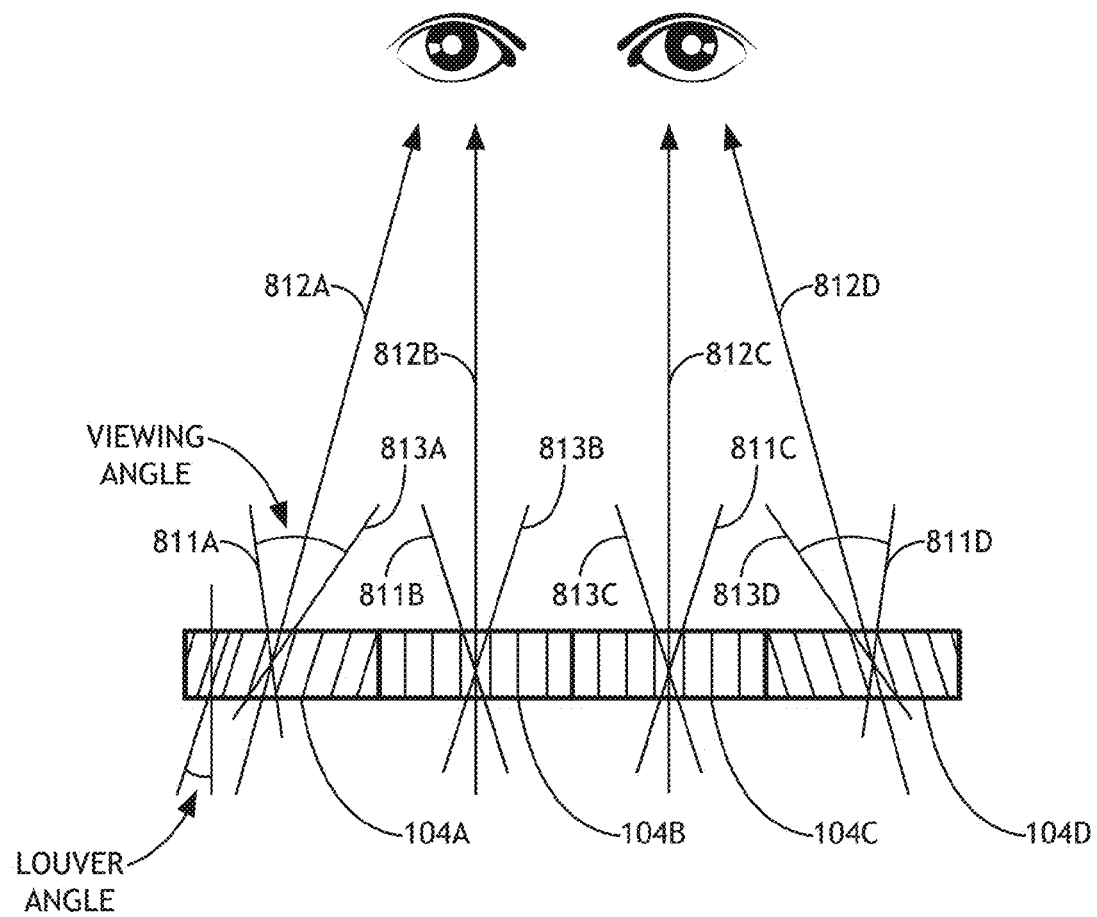
FIG. 8D shows a cross-sectional view of a piecewise light control film of some embodiments.

Referring now to FIG. 8D, a cross-sectional view of a piecewise light control film of some embodiments is shown. In some embodiments, the piecewise light control film is implemented as, included in, or affixed to a piecewise light control layer (e.g., a flat or non-flat piecewise light control layer) having a plurality of light control portions. In some embodiments, the piecewise light control film includes a plurality of light control film portions (e.g., 104A, 104B, 104C, 104D). In some embodiments, each of the plurality of light control film portions (e.g., 104A, 104B, 104C, 104D) is a micro-louver film portion. In one embodiment, the piecewise light control film includes a plurality of light control film portions (e.g., 104A, 104B, 104C, 104D) including a first light control film portion 104A, a second light control film portion 104B, a third light control film portion 104C, and a fourth light control film portion 104D. In one embodiment, the first light control film portion 104A is configured to restrict light having a first angular profile. In one embodiment, the second light control film portion 104B is configured to restrict light having a second angular profile. In one embodiment, the third light control film portion 104C is configured to restrict light having a third angular profile, wherein the third angular profile is the same as the second angular profile. In one embodiment, the fourth light control film portion 104D is configured to restrict light having a fourth angular profile, wherein the fourth angular profile is different from the first angular profile, the second angular profile, and the third angular profile, and wherein the fourth angular profile is opposite (e.g., reverse angular profile) to the first angular profile.

In some embodiments, each of the light control film portions have a unique set of micro-louver film properties such that each of the light control film portions is configured to restrict light having a different angular profile; however, in other embodiments, only some of the light control film portions have a different set of micro-louver film properties (e.g., micro-louver angle, micro-louver pitch, micro-louver film thickness, or micro-louver orientation) such that some of the light control film portions are configured to restrict light having a different angular profile than other portions of the light control film portions. For example, as shown in FIG. 8D, light control film portions 104B and 104C have the same micro-louver film properties including the same micro-louver angle, while the first light control film portion 104A and the fourth light control film portion 104D have different micro-louver film properties than the other light control film portions. In some embodiments, the piecewise light control portions are configured across the piecewise light control layer to provide any suitable light distribution across a display assembly. For example, in some embodiments, the piecewise light control portions each have micro louver film properties to angle transmitted light toward a design eye point. For example, as shown in FIG. 8D, light control film portions 104A, 104B, 104C, and 104D, each include micro-louvers angled to allow the transmission of light toward a design eye point. In some embodiments, piecewise light control layers are configured to reduce stray light and increase luminance viewed across the entire display.

As shown in FIG. 8D, in one embodiment, the light allowed to be transmitted through the first light control film portion 104A includes most edgewardly pointing transmitted light 811A, louver pointing transmitted light 812A (e.g., light transmitted with a same angle as the louver angle), and most inwardly pointing transmitted light 813A. Additionally, in one embodiment, the light allowed to be transmitted through the second light control film portion 104B includes most edgewardly pointing transmitted light 811B, louver pointing transmitted light 812B (e.g., light transmitted with a same angle as the louver angle), and most inwardly pointing transmitted light 813B. Also, in one embodiment, the light allowed to be transmitted through the third light control film portion 104C includes most edgewardly pointing transmitted light 811C, louver pointing transmitted light 812C (e.g., light transmitted with a same angle as the louver angle), and most inwardly pointing transmitted light 813C. Further, in one embodiment, the light allowed to be transmitted through the fourth light control film portion 104D includes most edgewardly pointing transmitted light 811D, louver pointing transmitted light 812D (e.g., light transmitted with a same angle as the louver angle), and most inwardly pointing transmitted light 813D. In one embodiment, a display field for the piecewise light control film may be defined at least in part by an angle between a direction of the most edgewardly pointing transmitted light (e.g., 811A) through a first edge film portion (e.g., the first light control film portion 104A) and a direction of the most edgewardly pointing transmitted light (e.g., 811D) through an opposite edge film portion (e.g., the fourth light control film portion 104A).

In some embodiments, the piecewise light control layer includes any suitable configuration or arrangement of piecewise light control portions with each light control portion having any suitable light control properties (e.g., micro-louver film properties) for particular design requirements. In some embodiments, the piecewise light control layer includes any suitable number (such as two, three, four, . . . 100, . . . 1000, or more) of piecewise light control portions with each light control portion having any suitable light control properties (e.g., micro-louver film properties) for particular design requirements. In some embodiments, the piecewise light control layer is non-flat, while in other embodiments, the piecewise light control layer is flat.

In some embodiments, the piecewise light control portions are implemented as a plurality of parallel strip-shaped portions which extend from one edge of the light control layer to an opposite end of the light control layer. Additionally, in some embodiments, the parallel strip-shaped portions are uniformly sized, while in other embodiments, the parallel strip-shaped portions are non-uniformly sized. In some embodiments, the piecewise light control portions are implemented as a plurality of uniformly or non-uniformly sized light control tile portions; for example, the piecewise light control portions may be implemented as a plurality of uniformly sized light control tile portions in an m by n grid (e.g., where m and n are positive integers greater than or equal to 2 to form a grid layout (e.g., a grid of 2×2, 3×2, 3×3, 4×2, 4×3, 4×4, . . . 100×100, or more). In some embodiments, the piecewise light control portions are implemented as a plurality of wedge-shaped light control portions arranged radially about a point (e.g., a center point, or otherwise) of the piecewise light control layer. In some embodiments, the piecewise light control layer may implemented to allow the transmission of any suitable distribution of transmitted light by adjusting the micro-louver film properties of the plurality of piecewise light control portions of the piecewise light control layer.

Additionally, in some embodiments, a display assembly (or other apparatus) may include two or more (e.g., two, three, four, or more) piecewise light control layers positioned one in front of the other (e.g., affixed to each other, affixed to a common substrate, affixed to different substrates or other elements which are abutting or spaced apart, or the like). For example, in some embodiments, a first piecewise light control layer is configured to restrict light along a first axis (e.g. horizontal, vertical, diagonal, or the like), and a second piecewise light control layer is configured to restrict light along a different axis (e.g., an axis orthogonal to the first axis, or otherwise different axis).

It is believed that embodiments of the present disclosure and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A display assembly, comprising:
   a cover substrate;
   a non-flat transmissive display element;
   at least one non-flat light control layer including at least one micro-louver film portion configured to restrict light having an angular profile, the at least one non-flat light control layer shaped to allow transmittance of light passing through the non-flat transmissive display element in a predetermined display field containing a predetermined design eye point, and to restrict transmittance of light outside of the predetermined display field containing the predetermined design eye point; and
   a backlight element configured to emit light such that a portion of the emitted light passes through the at least one non-flat light control layer, the non-flat transmissive display element, and the cover substrate,
   wherein the non-flat transmissive display element is positioned between the cover substrate and the at least one non-flat light control layer, and
   wherein the at least one non-flat light control layer is positioned between the transmissive display element and the backlight element.

2. The display assembly of claim 1, wherein at least one of the backlight element and the cover substrate is curved.

3. The display assembly of claim 1, wherein the at least one non-flat light control layer comprises a non-flat piecewise light control layer including a plurality of micro-louver film portions, the plurality of micro-louver film portions including a first micro-louver film portion and a second micro-louver film portion, the first micro-louver film portion configured to restrict light having a first angular profile, the second micro-louver film portion configured to restrict light having a second angular profile, wherein the first micro-louver film portion has at least one micro-louver film property different from other micro-louver film portions of the plurality of micro-louver portions.

4. The display assembly of claim 1,
   wherein the at least one non-flat light control layer is or includes at least one piecewise light control layer, a particular piecewise light control layer of the at least one piecewise light control layer including a plurality of light control portions, the plurality of light control portions including a first light control portion and a second light control portion, the first light control portion configured to restrict light having a first angular profile, the second light control portion configured to restrict light having a second angular profile, wherein the first angular profile is different from the second angular profile.

5. The display assembly of claim 4, wherein the particular piecewise light control layer is non-flat.

6. The display assembly of claim 4, wherein the particular piecewise light control layer is flat.

7. The display assembly of claim 4, wherein each of the plurality of light control portions includes a particular micro-louver film portion.

8. The display assembly of claim 7, wherein each particular micro-louver film portion has at least one micro-louver film property different from other micro-louver film portions of the plurality of light control portions.

9. The display assembly of claim 8, wherein each particular micro-louver film portion has at least one of a micro-louver film thickness, a micro-louver angle, a micro-louver pitch, or a micro-louver orientation different from other micro-louver film portions of the plurality of light control portions.

10. The display assembly of claim 4, wherein the plurality of light control portions further includes a third light control portion, the third light control portion configured to restrict light having a third angular profile, wherein the third angular profile is different from the first angular profile and the second angular profile.

11. The display assembly of claim 4, wherein the particular piecewise light control layer includes a transparent substrate, wherein the plurality of light control portions are affixed to or included within the transparent substrate.

12. The display assembly of claim 4, wherein the plurality of light control portions comprise a plurality of light control strip portions.

13. A display assembly, comprising:
    a non-flat emissive display element; and
    at least one non-flat light control layer including at least one micro-louver film portion configured to restrict light having an angular profile, at least one non-flat light control layer shaped to allow transmittance of light emitted from the non-flat emissive display element in a predetermined display field containing a predetermined design eye point and to restrict transmittance of light outside of the predetermined display field containing the predetermined design eye point.

14. The display assembly of claim 13, further comprising a cover substrate.

15. The display assembly of claim 14, wherein the at least one non-flat light control layer is positioned between the emissive display element and the cover substrate.

16. The display assembly of claim 14, wherein the cover substrate is curved.

17. The display assembly of claim 13, wherein the at least one non-flat light control layer comprises a non-flat piecewise light control layer including a plurality of micro-louver film portions, the plurality of micro-louver film portions including a first micro-louver film portion and a second micro-louver film portion, the first micro-louver film portion configured to restrict light having a first angular profile, the second micro-louver film portion configured to restrict light having a second angular profile, wherein the first micro-louver film portion has at least one micro-louver film property different from other micro-louver film portions of the plurality of micro-louver portions.

18. The display assembly of claim 13,
    wherein the at least one non-flat light control layer is or includes at least one piecewise light control layer, a particular piecewise light control layer of the at least one piecewise light control layer including a plurality of light control portions, the plurality of light control portions including a first light control portion and a second light control portion, the first light control portion configured to restrict light having a first angular profile, the second light control portion configured to restrict light having a second angular profile, wherein the first angular profile is different from the second angular profile.

* * * * *